March 31, 1953  N. LANGER  2,633,443
METHOD OF HEAT-SEALING
Filed July 14, 1949  2 SHEETS—SHEET 1
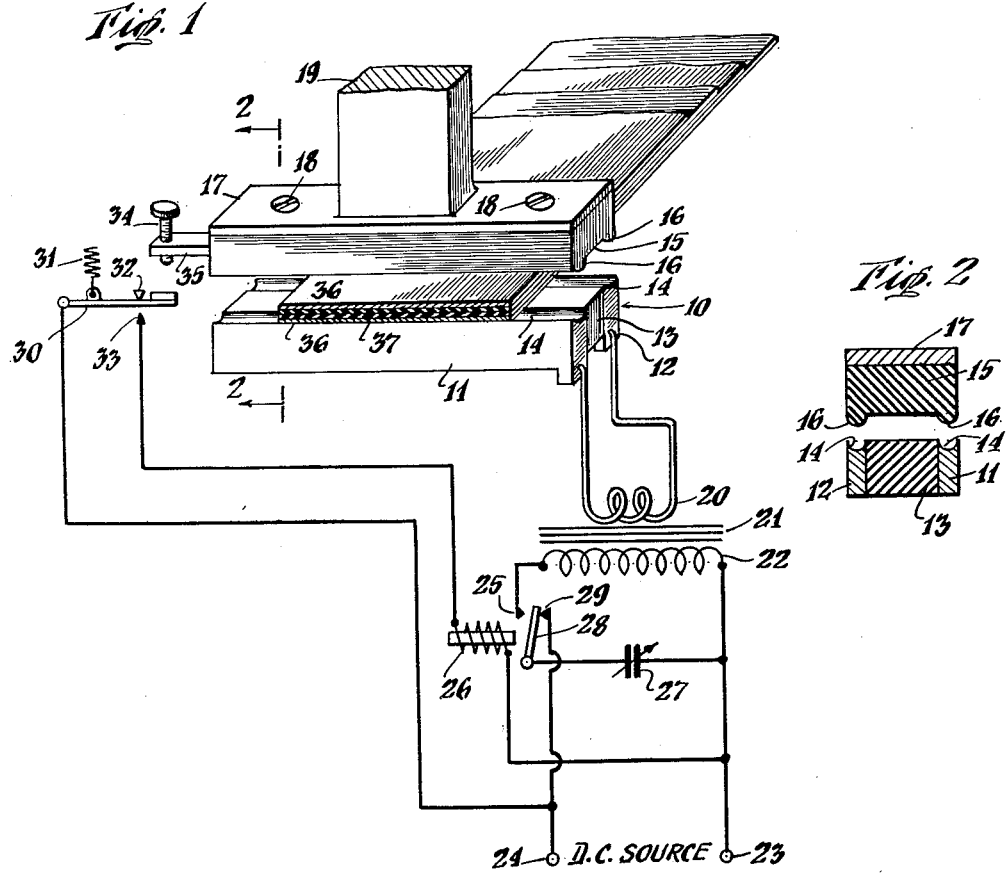
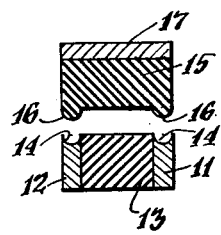
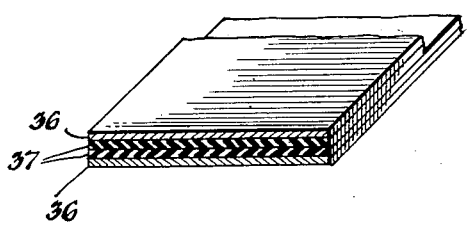
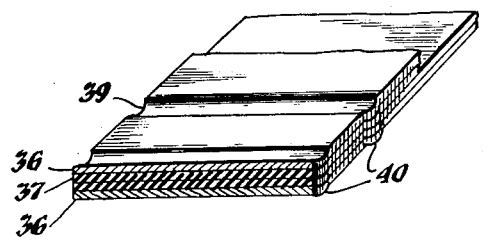
INVENTOR.
Nicholas Langer March 31, 1953 N. LANGER 2,633,443
METHOD OF HEAT-SEALING
Filed July 14, 1949 2 SHEETS—SHEET 2
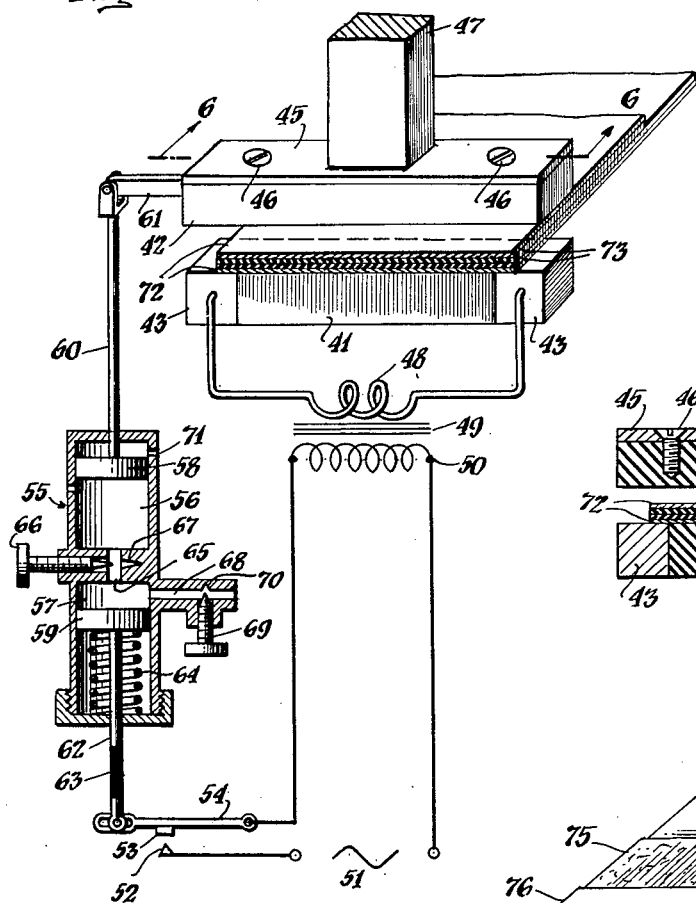
INVENTOR.
Nicholas Langer Patented Mar. 31, 1953

2,633,443

UNITED STATES PATENT OFFICE 2,633,443

METHOD OF HEATSEALING

Nicholas Langer, New York, N. Y.

Original application February 20, 1945, Serial No. 578,880. Divided and this application July 14, 1949, Serial No. 104,775

12 Claims. (Cl. 154—126)

The present invention relates to the art of heatsealing thermoplastic materials, and, more particularly, to a novel and improved method of heatsealing sheets including an electrically conducting layer and a thermoplastic layer, and to an apparatus for carrying such method into practice.

The present application is a division of my copending application Serial No. 578,880, filed February 20, 1945, now Patent No. 2,479,375.

As those skilled in the art know, thermoplastic sheets are at present used on a very substantial scale for packaging and related purposes. Such sheets may be formed from rubber hydrochloride, a filled vinyl polymer resin, polymerized vinyl chloride, heatsealing regenerated cellulose, and the like, all of which are readily obtainable on the market in various thickness. The principal advantage of these sheets is that they may be employed in forming bags, envelopes and similar containers for fluid-tightly enclosing the packaged material or at least preventing the entrance of moisture into or the discharge of moisture from the interior of the package. Another important advantage of such sheets is their heatsealing character, that is that substantially fluid-tight or moisture-proof seams may be formed therein by the application of heat and pressure to the regions where the seam is to be formed. In general, the surfaces of the sheet or sheets to be provided with a seam are brought together into face to face position and heat is applied to such regions to heat the thermoplastic materials therein to temperatures at which they become plastic or tacky. The substantially simultaneous application of pressure thereto will cause heatsealing of the plasticized regions so that upon cooling a fluid-tight or moisture-proof seam is formed which is mechanically at least as strong as the other portions of the sheet.

The thermoplastic sheets are in some cases employed for packaging purposes in their original condition but frequently they are laminated or otherwise combined with sheet-like materials which are flexible, although not thermoplastic. Examples of such auxiliary sheets are paper and metal foil. The object of such combination is to principally rely upon the auxiliary sheet or foil base for mechanical strength and thereby to reduce the necessary thickness of the relatively expensive thermoplastic material. In many cases the paper or foil base is merely coated with the thermoplastic material, a relatively thin coating being sufficient to assure the fluid-tight character of the finished sheet-like product. An added advantage of such composite sheets is that the paper or foil base, which normally forms the exterior of the finished package, can be easily provided with printing and thus tends to enhance the attractiveness and the sales appeal of the finished product.

Conventional heatsealing machines practically invariably comprise a pair of heatsealing bars or jaws at least one of which is made of metal and is heated to heatsealing temperatures for example by means of an electrical heater element, and the other of which may be made of metal or rubber and is generally unheated. The two sheets to be sealed together or the two regions of the same sheet to be sealed are brought into face to face position and are introduced between the said heatsealing bars or jaws. Thereafter, the two jaws are pressed together causing heating of the thermoplastic layers and partial fusion or heatsealing thereof. After this has been accomplished, the jaws are again separated and the sealed sheets are removed from the machine. Essentially, this identical procedure is employed for forming the empty bag or envelope from one or more sheets of the thermoplastic material and also for placing the final closure or seal upon the container or package after it has been filled with the commodity to be packaged.

This conventional heatsealing practice was connected with various difficulties. Thus, first of all, each heatsealing operation tended to withdraw substantial amounts of heat from the hot heatsealing bar. The amount of such heat withdrawn was particularly considerable in high-speed, automatic packaging or bag-making machines. Also, in addition to several other factors, the degree of heat withdrawal was a function of the number of heatsealing operations carried out per unit time. For this reason, it was necessary to employ complex and sensitive thermostatic controls for the heatsealing bars and to provide heatsealing bars of very substantial heat capacity. This greatly increased the bulk and the weight of the heatsealing bars and also the current consumption of the unit. Even so, it was extremely difficult to obtain high operating speeds and at the same time to assure proper heatsealing temperatures at any and all speeds in view of the narrow temperature ranges which have to be maintained for the production of perfect seals. Another difficulty was that the heatsealing bar was continuously heated so that upon separation of the same the seam region was just as hot as during the process of heatsealing, such region having had no time for cooling off. This circumstance frequently caused great difficulties as the hot seam region would separate or the seam formed was weak and imperfect and did not have the desired fluid-tight and moisture-proof characteristics. This constituted a very serious problem particularly in forming hermetically sealed or vacuum packages. Moreover, the heatsealing bar or bars had to be preheated for a long period before heatsealing operations could be started thereby causing great loss of time, particularly where relatively short "runs" of packages had to be sealed at a time. Although from time to time various suggestions and proposals were made to eliminate the foregoing difficulties, none, as far as I am aware, of these suggestions and proposals was completely satisfactory and successful when carried into practice on a practical and commercial scale.

I have discovered a simple and completely satisfactory solution of the outstanding problem.

It is an object of the present invention to eliminate the difficulties heretofore encountered in carrying out heatsealing operations on thermoplastic sheets or webs.

It is another object of the invention to provide a novel and improved method of heatsealing thermoplastic sheets in which the welding heat is directly and practically instantaneously produced in one of the layers of the materials to be heatsealed which are pressed together by means of unheated pressure members or bars.

It is a further object of the present invention to provide a method of heatsealing composite sheets including at least one electrically conducting layer and a thermoplastic layer wherein the sealing heat is produced by passing an electrical current through the sealing region of the conducting layer.

It is also within the contemplation of the invention to provide a heatsealing machine of novel character from which heated bars are completely absent and in which during the heatsealing operation a pair of spaced electrode bars or rails are pressed against the surface of one of the conducting layers of the sheets, and a current of predetermined intensity and duration is passed between the said electrode members to cause heatsealing of the underlying coextensive thermoplastic layers.

The invention also contemplates a heatsealing machine of novel and improved character which is very simple in construction, satisfactory and foolproof in operation regardless of of the operating speeds, which is at all times instantaneously ready for operation, and which may be readily manufactured on a practical and industrial scale at a low cost.

Other and further objects and advantages of the invention will become apparent from the following description, taken in conjunction with the accompanying drawings; in which:

Fig. 1 is a somewhat fragmentary perspective view, having parts in section, of a heat-sealing machine embodying the invention, together with a preferred form of circuit organization therefor;

Fig. 2 is a section taken on line 2—2 of Fig. 1;

Fig. 3 is a perspective view of a pair of composite sheets before the heat-sealing operation, the thickness of the several layers being greatly exaggerated for clarity of illustration;

Fig. 4 is a similar view of the same sheets after the heat-sealing operation;

Fig. 5 is a perspective view, also somewhat fragmentary and having parts in section, of a modified heat-sealing machine embodying the invention, including a preferred form of operating mechanism and circuit therefor;

Fig. 6 is a section taken on line 6—6 of Fig. 5;

Fig. 7 is a perspective view of a special thermoplastic sheet;

Fig. 8 is a perspective view of a bag embodying the invention and especially adaptable for carrying the method of the invention into practice; and Fig. 9 is a section taken on line 9—9 of Fig. 8.

Referring now more particularly to Figs. 1 and 2 of the drawing, reference numeral 10 generally denotes a lower heat-sealing or pressure member comprising a pair of metallic electrode members or rails 11 and 12 separated from each other by means of a bar 13 constituted of a suitable insulating material, such as phenol formaldehyde resins, pressed mica powder, natural or synthetic rubber, and the like. As it will be best observed in Fig. 2, the top surface of electrode rails 11 and 12 is formed with a longitudinally extending channel-shaped depression 14, the object of which will appear presently, while the corresponding top surface of insulating bar 13 is flat.

The top surface of lower pressure member 10 is adapted to cooperate with an upper pressure member or bar 15 preferably constituted of an insulating material having at least some elasticity, for example rubber, although a substantially rigid insulating material or a metallic material having good heat conductivity may be also employed with equal or similar results. It will be noted that the lower or operating surface of the upper pressure member is conforming in shape to that of the lower pressure member and accordingly includes a pair of spaced elongated ribs or ridges 16 corresponding to channel-shaped depressions in electrode rails 11 and 12. To increase the mechanical strength of the upper pressure member, it is backed up by a metal backing plate 17, to which it is secured by means of screws 18. The machine also includes manually or automatically operable operating means, diagrammatically indicated by means of operating member or rod 19, which is integrally formed with or is attached to backing plate 17. Thus, the upper pressure member 15 may be displaced towards and pressed against the lower pressure member 10 and pressure may be applied upon the corresponding region of a pair of sheets interposed therebetween.

Electrode rails 11 and 12 are respectively connected to the ends of secondary winding 20 of a step-down transformer 21. The primary winding 22 of the said transformer has one of its ends directly connnected to terminal 23 of a direct current source, while its other end is connected to working contact 25 of a relay 26. A condenser 27 of substantial and adjustable capacity is connected between terminal 23 of the source and armature 28 of the relay, while rest contact 29 of the said relay is connected to the other terminal 24 of the source.

The operating circuit of the machine comprises a switching arm 30 which is normally upwardly urged by means of a spring 31, its upward displacement being restricted by a stop 32. This switching arm is connected to terminal 24 of the source. Upon its depression, the switching arm is adapted to cooperate with a working contact 33 which is connected to one end of the operating coil of the relay 26, the other end of said coil being connected to terminal 23 of the source. Switching arm 30 may be actuated by means of a screw 34 extending through a laterally protruding arm 35 mounted on one side of upper pressure member 15 so that the switching arm will be actuated some time during displacement of the upper pressure member, after the compressed position of the upper and lower pressure member has been obtained. The time of such actuation may be accurately determined and adjusted by adjustment of screw 34.

From the foregoing description, the operation of the heat-sealing machine of the invention will be readily understood by those skilled in the art.

When it is desired to produce a heat seal on a pair of sheets of packaging material, each of said sheets including an electrically conducting layer 36, such as metal foil, and a thermoplastic layer 37, such as rubber hydrochloride, polymerized vinyl chloride, heat-sealing regenerated cellulose, or the like, the corresponding regions of the sheets are interposed between pressure members 10 and 15 so that the thermoplastic layers of the sheets are in face to face contact with each other (Figs. 1 and 3). Thereafter, the upper pressure member 15 is displaced manually or by a power-operated mechanism.

Upon displacement of the two pressure members towards each other, ribs 16 of the upper pressure member will force the interposed regions of the sheets into the corresponding depressions or channels 14 of electrode rails 11 and 12 so that the region of the lowest conducting layer of one sheet will be electrically connected to the two rails as a result of the intimate contact and pressure prevailing therebetween. Condenser 27, which in the normal position of rest is connected between terminals 23 and 24 of the D. C. source through rest contact 29 and armature 28 of relay 26, will be fully charged and in view of its large capacity, which may be in the range between 10 and 100 microfarads, will have a substantial amount of electrical energy stored therein.

When finally during further depression of the upper pressure member screw 34 will depress switching arm 30 and will close its contact 33, relay 26 will be energized and will transfer its armature 28 from its rest contact 29 to its working contact 25. Thus, condenser 27 will be immediately disconnected from the source and will be connected across primary winding 22 of the transformer. The condenser will discharge through the said primary winding and will induce a current of lower voltage but of considerable intensity in its secondary circuit, comprising secondary winding 20, electrode rails 11 and 12 and the strip of conducting material in layer 36 which is electrically connected between the said two rails. While this current impulse is of a relatively short duration and frequently may last only for a fraction of a second, its intensity is substantial enough to practically instantaneously increase the temperature of the lowest conducting layer 36 and also of the two superposed thermoplastic layers 37 to heat-sealing temperatures. As a result of the presence of these temperatures in the heat-sealing region and of the simultaneous application of pressure thereto, the said regions will be fused together so that a firm, fluid-tight and permanent seam will be formed. This will appear from Fig. 4, showing the two sheets after the heat-sealing operation. It will be noted that the thermoplastic layers 37 will be permanently bonded together so that they practically lose their individual identity in the region of the seam. As a result of the pressure exerted by ribs 16 and channels 14 of the upper and lower pressure members, respectively, corresponding depressions 39 and ridges 40 will be generally permanently retained in the completed seam. It has been found that the presence of such curved surfaces in the seam is advantageous in order to obtain a more intimate contact with the two thermoplastic layers in the critical region, whereby increased strength and fluid-tightness of the seam is assured.

Obviously, the charge of condenser 27 is very rapidly dissipated in the primary winding, so that the secondary or heatsealing current will quickly disappear. Therefore, overheating of the thermoplastic layers is positively prevented. Thus, when a short period after the discharge of the condenser the two pressure members are again separated, the seam had already sufficient time to cool below the plasticizing temperature of the thermoplastic layers and to consolidate, providing a strong and sound seam. The provisions of a sufficient cooling period for the thermoplastic layers may be also positively assured by a suitable locking mechanism for the upper pressure member, preventing its premature upward displacement. A locking mechanism of this type is disclosed in my co-pending application Serial No. 572,882, filed January 15, 1945, now Patent No. 2,460,460, to which reference is hereby made.

The amount of electrical energy dissipated in the transformer for the production of a single seam may be adjusted in various ways such as by varying the capacity of condenser 27 or the voltage of the direct current source, and also in many other ways obvious to those skilled in the art. The energy necessary for forming a good seam will be a function of various factors, such as the thickness of the thermoplastic layers, the physical characteristics of the said layers, and the width of the sheets to be sealed. In any case, the optimum energy may be readily determined and maintained after a few trial seals.

While the circuit illustrated and described in Figs. 1 and 2 is based on the principle of stored direct current energy, the machine of the invention may be also operated from commercial alternating current power lines by interposing a conventional rectifier system. It is also possible to store the heatsealing energy in the electromagnetic field of a coil, rather than in the electrostatic field of a condenser.

The modified embodiment of the invention illustrated in Fig. 5 and 6 comprises a lower pressure member or bar 41 and an upper pressure member or bar 42, both being constituted of insulating material, such as a phenol formaldehyde resin, pressed mica powder and the like. If desired, one or both of the said pressure members may be constituted of an insulating material of an elastic character, such as rubber. At each end of lower pressure member 41 there is mounted an electrode block 43 made of metal of high electrical conductivity. In order to retain good surface conductivity for long periods of time, the top surface of the said blocks may be plated with a suitable metal, such as silver. It will be noted that the top surface of the said blocks forms a generally unbroken, smooth and flat surface with that of pressure member 41.

The top pressure member is constituted by insulative bar 42 having a smooth lower surface and backed up at its top surface by means of a metal plate 45, to which it is secured by means of screws 46. The upper pressure member may be displaced towards the lower one by means of a manually or power-operated mechanism, diagrammatically indicated by means of upwardly extending shank 47, which may be integrally formed with backing plate 45 or may be welded or otherwise secured thereto.

Electrode blocks 43 may be energized from the secondary winding 48 of a step-down transformer 49, to the ends of which the said blocks are respectively connected. Primary winding 50 may be energized from the alternating current power line 51, by closing contacts 52 and 53, by downward displacement of switching arm 54.

Operation of switching arm 54 is under the control of a pneumatic control mechanism generally denoted by numeral 55. This mechanism comprises a pair of coaxial cylinders 56 and 57 defined in a suitable casting, and having pistons 58 and 59, respectively slidably mounted thereon. Upper piston 58 has a push rod 60 upwardly extending therefrom, which is linked to a laterally extending arm 61 of upper pressure member 42. A similar push rod 62 extends downwardly from lower piston 59 and is mechanically linked at its lower end to switching arm 54, but is electrically disconnected therefrom by the interposition of an insulating member 63. Piston 59 is upwardly urged by means of a coil spring 64 arranged within cylinder 57 and around push rod 62.

Cylinders 56 and 57 are communicating with each other through a short channel 65, the effective cross section of the said channel being adjustable by means of a screw 66 having a pointed end and adapted to cooperate with a conical seat 67, thereby constituting a valve structure similar to a conventional needle valve. An air outlet duct 68 is connected to the upper portion of cylinder space 57 and its effective cross section may be controlled by means of a similar needle valve structure comprising screw 69 cooperating with conical seat 70. A permanently open air inlet duct 71 is provided in cylinder 56 above the normal position of rest of piston 58.

During the operation of the machine a pair of sheets to be heat-sealed together are introduced between upper and lower pressure members 41 and 42. Each of said sheets includes a layer of electrically conducting material 72, such as for example metal foil, and a layer or coating of thermoplastic material 73. The regions of the two sheets to be heatsealed are brought into face to face relation so that thermoplastic layer faces thermoplastic layer. Thereafter, the upper pressure member is displaced downwardly by means of a manually or power operated mechanism, the details of which are omitted for the sake of simplicity. It will be noted that the corresponding regions of the two sheets will be superposed and will be strongly compressed by the two pressure members.

Simultaneously with the downward displacement of the upper pressure member 42, piston 58 will be likewise displaced, thereby rapidly compressing the air within cylinder 56. The increase of pressure in lower cylinder 57, however, will be somewhat delayed as a result of the relatively small cross section of channel 65 between the two cylinders. A short period of time thereafter the pressure differential in the lower cylinder will build up to a value sufficient to displace piston 59 downwardly, against the pressure of spring 64. The small amount of air leaking off through conduit 68 will not be sufficient to greatly delay this mode of operation.

Downward displacement of lower piston 59 will actuate switching arm 54 and will close contacts 52 and 53, thereby connecting primary winding 50 of the transformer across the source of alternating current 51. A current of low voltage and of relatively high intensity will be induced in the secondary circuit, including secondary winding 48 of the transformer and a narrow strip of the lowermost and electrically conducting layer 72 of the two sheets, which is effectively electrically connected between the two electrode blocks 43 by surface contact and pressure. This current is of sufficient intensity to rapidly heat the said electrically conducting strip and also the other superposed layers of the sheets to heatsealing temperatures. As a result of such temperatures prevailing also at the boundary surface of the two thermoplastic layers and of the pressure applied thereto by the cooperation of the two pressure members, the sheets will be heatsealed together in the corresponding regions thereof. During this time, both pistons 58 and 59 will be at the lower end of their stroke.

During all this time, however, compressed air in the lower cylinder will continue to leak off at a slow rate through outlet channel 68. Thus, spring 64 gradually regains control and slowly returns the lower piston into its normal position of rest and interrupts the primary current between contacts 53 and 52, thereby deenergizing the transformer and discontinuing heating of the thermoplastic layers.

It will be noted that the pneumatic control mechanism provides two different, distinct and individually adjustable time delay periods. The first one of these, adjustable by screw 66, delays closure of the energizing circuit of the heatsealing means until the thermoplastic layers are in their compressed position and a positive electrical contact has been already established between the lowermost conducting layer and the two electrode blocks. The other time delay period, adjustable by means of screw 69, determines the time when the primary circuit is again automatically opened and prevents insufficient or excessive heating of the thermoplastic layers. Both of these periods can be easily, accurately and positively adjusted in accordance with variable conditions of operation, such as for sealing sheets of different thickness, constituted of materials having different physical characteristics including the melting points of the thermoplastic layers, and the like. In general, the cross section of channel 65 between the two cylinders will be adjusted to a considerably greater cross section than air outlet duct 68.

One of the advantages of a pneumatic time delay mechanism of the character described is its great simplicity of construction and great accuracy of operation. Also, a time delay mechanism of the described type may be easily built in very small dimensions so that it may be readily incorporated into existing heatsealing machines without any expensive structural changes.

The heatsealing machines disclosed in the foregoing provide excellent results in sealing together conventional packaging materials having an electrically conducting layer combined with a thermoplastic layer. Preferred examples of such sheets are sheets of aluminum foil laminated or coated with a thermoplastic material, such as rubber hydrochloride, which are used on a large scale at present in the packaging industry. The machine is equally useful in forming envelopes or bags from sheets of the described type by applying heat seals to predetermined registering regions thereof, or for applying the final seal or closure to the envelope, bag or package, after it has been filled with the commodity to be packaged.

The machines of the invention are also applicable to sealing sheets in which there is no electrically conducting layer provided throughout the surface of the sheet. In accordance with the principles of the invention, this is accomplished by providing a suitable electrically conducting layer only in the sealing region. A sheet of this type is illustrated in Fig. 7 and comprises a thermoplastic layer 74, a suitable backing layer 75, which may be a fibrous cellulosic material, such as paper, and a narrow strip 76 of an electrically conducting material, such as aluminum foil, which is cemented, sealed or otherwise secured to the backing layer. Obviously, a sheet of this type will function in the same way as a sheet in which the electrically conducting layer extends throughout the surface of the thermoplastic layer provided that it is inserted in the proper cooperating relation with respect to the electrode members of the heatsealing machine. If desired, the conducting strip 76 may be of such mechanical strength and of a length extending beyond the terminal regions of the finished bag or package so that it may also constitute a tearing strip therefor, thereby facilitating opening of the sealed package or bag. In some cases the backing layer 75 may be altogether omitted and the conducting strip may be directly secured to or laminated with the predetermined region of the thermoplastic sheet.

Fig. 8 illustrates a further modification of the invention and shows a bag or envelope 77 formed of a single sheet of packaging material, including a thermoplastic layer 78 and a cellulosic backing layer 79, folded upon itself along line 80 and sealed together along two parallel edges, as indicated at 81. A thin deposit or film 82 of an electrically conducting material is provided across at least one side of the mouth portions of the bag. This deposit may be provided by means of spraying, printing or otherwise applying an electrically conducting paint, lacquer or paste to the said region, as those skilled in the art will readily understand. Of course, the electrical resistance of such a thin layer or film of conducting material may be considerably higher than that of a self-sustaining strip of metal foil. However, this higher resistance may be readily compensated for by employing a correspondingly higher voltage, which is applied to the two contact electrode rails or blocks. In most cases it is desirable to provide for the control of such voltage by conventional voltage adjusting means in order to adapt the operation of the machine to conductive layers of different character and also in accordance with the length of the seam which is to be formed. Obviously, a bag of the type shown in Fig. 8 may be sealed in the same way as bags of which the whole exterior is constituted of conducting material, provided that the proper relation of the deposit of conducting material to the sealing electrodes is observed.

Although the present invention has been disclosed in connection with a few preferred embodiments thereof, variations and modifications may be resorted to by those skilled in the art without departing from the principles of the present invention. I consider all of these variations and modifications as within the true spirit and scope of the present invention, as disclosed in the foregoing description, and defined by the appended claims.

What is claimed is:

1. The method of heatsealing composite sheets including a metallic layer and a thermoplastic layer along a positively defined strip which comprises bringing the thermoplastic layers of the sheets into face to face position in the region of said strip, pressing an electrode against each end of one of the metallic layers of said strip to make electrical connection thereto, passing an electric current between said electrodes and through the metallic layer therebetween constituting a heater element, said current being of sufficient duration and intensity to heat coextensive strips of the thermoplastic layers to heatsealing temperatures, applying pressure to said sheets substantially throughout the area of said strip to cause heatsealing of the thermoplastic layers and production of a seam coextensive with said strip which permanently incorporates said heater element, and then removing said electrodes from the metallic layer and discontinuing said pressure.

2. The method of heatsealing in an elongated linear strip two composite sheets each of which includes a thermoplastic layer and at least one of which includes a layer of metal foil which comprises bringing the thermoplastic layers of said sheets into face to face position in the region of said strip, pressing an electrode against one of said foil layers at each longitudinal end of said strip, passing an electrical current between said electrodes and through the portions of the foil therebetween along said strip constituting a heater element to produce heatsealing temperatures in the several layers in the region of said strip, applying pressure to substantially the complete area of said strip, to cause heatsealing of the thermoplastic layers therein, discontinuing said electrical current, maintaining said pressure for a time after discontinuing the current sufficient to permit the thermoplastic layers to cool and to consolidate into a seam permanently incorporating said heater element, and then removing said electrodes from said foil.

3. The method of heatsealing in an elongated linear strip two composite sheets each of which includes a thermoplastic layer and at least one of which includes a layer of metal foil which comprises bringing the thermoplastic layers of said sheets into face to face position in the region of said strip, pressing an elongated electrode against each transverse end of said strip thereby defining a heater element in the form of a metallic ribbon the width of which is interposed between the electrodes, passing heating current across the width of said ribbon and between said electrodes for a predetermined period to raise the temperature of the ribbon and of the thermoplastic layers underneath to plasticizing temperatures, pressing said sheets together in the region of said ribbon while said thermoplastic layers are still plastic to cause the formation of a coextensive seam permanently incorporating said metallic ribbon, and then removing said electrodes from said metallic ribbon.

4. The method of forming a seam on a pair of sheets each of which includes a thermoplastic layer and at least one of which includes an electrically conducting layer which comprises compressing the thermoplastic layers in face to face position in the region of a positively defined strip wherein the seam is to be formed, applying an electrode against each longitudinal end of said strip thereby defining a heater element in the form of a metallic ribbon the length of which is interposed between the electrodes, passing heating current through the length of said ribbon and between said electrodes for a predetermined period sufficient to raise the temperature of the ribbon and of the underlying thermoplastic layers to plasticizing temperatures and to cause the formation of a so extensive seam premanently incorporating said metallic ribbon, and then removing said electrodes from said metallic ribbon.

5. The method of heatsealing sheet materials including an electrically conducting layer and a thermoplastic layer which comprises bringing a pair of sheets of the material into face to face position to have the thermoplastic layers within the conducting layers, compressing the layers between two surfaces one of which includes a pair of spaced electrodes brought into pressure contact with one conducting layer, passing an electric current through the region of the conducting layer interposed between said electrodes thereby to cause heating and bonding of the coextensive regions of the thermoplastic layers, and then discontinuing the compression and removing the electrodes from said conducting layer.

6. The method of heatsealing a composite sheet including an electrically conducting layer and a thermoplastic layer which comprises applying the regions to the sheet to be sealed against each other to bring the thermoplastic layers into face to face position, pressing a pair of spaced electrodes connected to a source of current against terminal portions of the corresponding region of the conducting layer to pass an electrical current through said region constituting a heater element thereby to heat the underlying thermoplastic layer to heatsealing temperatures, applying pressure to said regions to cause bonding thereof and permanent incorporation of said heater element into the bond, and then removing said electrodes from said conducting layer.

7. The method of heatsealing composite sheets including a layer of metal foil and a layer of thermoplastic material which comprises bringing the thermoplastic layers of the sheets into face to face position along a positively defined continuous strip to be heatsealed, bringing a pair of spaced electrodes connected to a source of current into surface contact with the terminal portions of a corresponding strip of one of the foils constituting a heater element thereby to pass current through said strip and to heat the thermoplastic layers coextensive therewith to heatsealing temperatures, applying pressure to said strip to cause heatsealing of said thermoplastic layers and permanent incorporation of said heater element into the seam, disconnecting said source of current from said electrodes before releasing said pressure, and then releasing said pressure and removing said electrodes from said foil.

8. The method of heatsealing sheets including a layer of electrically conducting material and a layer of thermoplastic material which comprises bringing the thermoplastic layer of the sheets into face to face contact in the region wherein a seam is to be formed, compressing said region of the layers between two surfaces one of which includes a pair of spaced electrodes brought into pressure contact with the respective ends of a coextensive region of one conducting layer, dissipating a predetermined amount of electrical energy in the circuit constituted by said electrodes and the conducting region therebetween to cause fusion and heatsealing of said thermoplastic layer, and removing said electrodes from the conducting layer and discontinuing the compression after said electrical energy has been substantially dissipated and the fused layers have cooled and consolidated into a seam.

9. The method of heatsealing sheets including a layer of electrically conducting material and a layer of thermoplastic material which comprises pressing the thermoplastic layers of the sheets into face to face contact in the region wherein a seam is formed, bringing a pair of spaced electrodes into pressure contact with the respective ends of a coextensive region of one conducting layer constituting a heater element, passing a short current impulse of high intensity through the circuit formed by said electrodes and said heater element to practically instantaneously heat the underlying thermoplastic layers to heatsealing temperatures and to cause fusion and heatsealing of said layers, and removing said electrodes and the pressure from the said region after the fused layers have cooled and the seam has consolidated into a structure permanently incorporating said heater element.

10. The method of bonding together an electrically conducting layer and another layer by means of a thermoplastic layer interposed therebetween which comprises bringing a pair of spaced electrodes into pressure contact with said conducting layer, passing an electric current through the circuit constituted by said electrodes and the conducting layer therebetween to heat the corresponding region of the thermoplastic layer to bonding temperatures, pressing the said region of the layers together to cause permanent bonding thereof, and then removing said electrodes from said conducting layer.

11. The method of bonding together a metallic layer and another layer by means of a thermoplastic layer interposed therebetween which comprises pressing a pair of spaced electrodes into surface contact with said metallic layer, passing a short current impulse of high intensity through the electrical circuit constituted by said electrodes and the portion of the metallic layer interposed therebetween to cause heating and permanent bonding of the coextensive layers, and removing the pressure of said electrodes after said current impulse has been dissipated and the bond has consolidated.

12. The method of bonding together a metallic layer and another layer by means of a thermoplastic layer interposed therebetween which comprises compressing the layers between a backing surface and another surface including a pair of spaced electrodes applied against the metallic layer, passing a current impulse through the electrical circuit formed by said electrodes and the portion of the metallic layer therebetween to cause heating and permanent bonding of the coextensive layers, and discontinuing the pressure and removing the said electrodes from the metallic layer after said current impulse has been dissipated and the bond has consolidated.

NICHOLAS LANGER.

REFERENCES CITED

The following references are of record in the file of this patent:

UNITED STATES PATENTS

| Number | Name | Date |
|---|---|---|
| 2,236,766 | Schneider | Apr. 1, 1941 |
| 2,241,312 | Luty | May 6, 1941 |
| 2,339,063 | Frixione | Jan. 11, 1944 |
| 2,378,801 | Sidell et al. | June 19, 1945 |
| 2,410,282 | Frixione | Oct. 29, 1946 |
| 2,438,498 | S. R. Geist, Sr., et al. | Mar. 30, 1948 |
| 2,444,094 | Duggan | June 29, 1948 |
| 2,460,460 | Langer | Feb. 1, 1949 |
| 2,477,040 | Brown et al. | July 26, 1949 |
| 2,493,968 | Hepner | Jan. 10, 1950 |
| 2,542,702 | Prow | Feb. 20, 1951 |